(12) United States Patent
Aoki (10) Patent No.: US 12,489,998 B2
(45) Date of Patent: Dec. 2, 2025

(54) PHOTOELECTRIC CONVERSION APPARATUS, CONTROL METHOD THEREOF, IMAGE CAPTURING APPARATUS, AND STORAGE MEDIUM

(71) Applicant: CANON KABUSHIKI KAISHA, Tokyo (JP)

(72) Inventor: Shigeharu Aoki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 18/640,233

(22) Filed: Apr. 19, 2024

(65) Prior Publication Data
US 2024/0373144 A1    Nov. 7, 2024

(30) Foreign Application Priority Data
May 2, 2023 (JP) ................. 2023-076313

(51) Int. Cl.
*H04N 25/771* (2023.01)
*H04N 25/59* (2023.01)
*H04N 25/76* (2023.01)
*H04N 25/78* (2023.01)

(52) U.S. Cl.
CPC .......... *H04N 25/771* (2023.01); *H04N 25/59* (2023.01); *H04N 25/7795* (2023.01); *H04N 25/78* (2023.01)

(58) Field of Classification Search
CPC .... H04N 25/59; H04N 25/7795; H04N 25/78; H04N 25/771
See application file for complete search history.

(56) References Cited

U.S. PATENT DOCUMENTS

| | | | | |
|---|---|---|---|---|
| 7,568,628 | B2* | 8/2009 | Wang ................. | G06K 7/10722 235/462.07 |
| 10,154,220 | B2* | 12/2018 | Vogelsang ............ | H10F 39/809 |
| 10,644,410 | B2* | 5/2020 | Sorgius ................. | G03B 15/05 |
| 2003/0151050 | A1* | 8/2003 | Fox ........................ | H04N 25/65 257/59 |
| 2006/0202036 | A1* | 9/2006 | Wang ................... | H04N 25/745 235/462.07 |
| 2013/0135486 | A1 | 5/2013 | Wan | |
| 2018/0124343 | A1* | 5/2018 | Vogelsang ............. | H04N 25/78 |
| 2019/0342481 | A1* | 11/2019 | Sorgius ................ | H05B 47/125 |

* cited by examiner

*Primary Examiner* — Nicholas G Giles
(74) *Attorney, Agent, or Firm* — Cowan, Liebowitz & Latman, P.C.

(57) ABSTRACT

A photoelectric conversion apparatus having a plurality of pixels each including a photoelectric conversion element and a plurality of first holding portions, comprises a control unit that controls a charge accumulation period in the photoelectric conversion elements in units of predetermined minimum controllable period, and a setting unit that sets a charge accumulation period in one frame period. The control unit controls to transfer charges from the photoelectric conversion elements to the first holding portions in turn a plurality of times during each frame period, and controls the charge accumulation period in the photoelectric conversion elements such that a difference between the set charge accumulation period and a total of divided charge accumulation periods for accumulating charges to be transferred the plurality of times in each frame period becomes shorter than the minimum controllable period.

12 Claims, 7 Drawing Sheets

PHOTOELECTRIC CONVERSION APPARATUS, CONTROL METHOD THEREOF, IMAGE CAPTURING APPARATUS, AND STORAGE MEDIUM

BACKGROUND OF THE INVENTION

Field of the Invention

The present invention relates to a photoelectric conversion apparatus, control method thereof, image capturing apparatus, and storage medium, and more particularly to a technique for controlling charge accumulation period in a photoelectric conversion apparatus.

Description of the Related Art

Some so-called CMOS image sensors have a global shutter (GS) function realized by providing a charge holding section in each pixel. A pixel of such an image sensor includes a gate that transfers signal charges accumulated in a photoelectric conversion unit to a charge holding section. In other words, the GS function is basically achieved by transferring charges from the photoelectric conversion units to the charge storage units at the same time in all pixels, thereby making the start and end timings of charge accumulation in the photoelectric conversion units the same for all pixels.

On the other hand, there is an image sensor in which a plurality of charge holding sections are configured with respect to each photoelectric conversion unit and charges are transferred to the charge holding sections multiple times during one frame period, thereby a plurality of images with different total accumulation periods of charges which are transferred to the different charge holding sections can be obtained. Then, by composing the plurality of obtained images, an image with improved dynamic range can be obtained.

US-2013-0135486 discloses a configuration in which a plurality of charge storage portions are provided for each photoelectric conversion unit.

In the configuration described in US-2013-0135486, charges are transferred in division from the photoelectric conversion unit to the plurality of charge storage portions multiple times, and charge accumulation periods of the photoelectric conversion unit until the charges are transferred to the plurality of charge storage portions from the photoelectric conversion units are constant. In this case, the total charge accumulation period of the charges transferred from the photoelectric conversion unit to the plurality of charge storage portions is the sum of the products of each charge accumulation period of charges transferred to the plurality of charge storage portions multiplied by the number of transference. One charge accumulation period in the photoelectric conversion unit is, for example, an integral multiple of the minimum unit time that can be controlled by a clock signal, etc. Therefore, the total charge accumulation period may include an error of the minimum unit time or longer with respect to the charge accumulation period desired by the user.

SUMMARY OF THE INVENTION

The present invention has been made in consideration of the above situation, and in a photoelectric conversion apparatus that transfers charges from a photoelectric conversion unit in division to a plurality of charge storage sections a plurality of times, makes the total charge accumulation period approach a charge accumulation period which is arbitrarily set.

According to the present invention, provided is a photoelectric conversion apparatus having a plurality of pixels each including a photoelectric conversion element that converts incident light into charges and accumulates the charges, and a plurality of first holding portions, the apparatus comprising: a control unit that controls a charge accumulation period in the photoelectric conversion elements in units of predetermined minimum controllable period; and a setting unit that sets a charge accumulation period in one frame period, wherein the control unit controls to transfer charges from the photoelectric conversion elements to the plurality of first holding portions in turn a plurality of times during each frame period, and controls the charge accumulation period in the photoelectric conversion elements such that a difference between the set charge accumulation period and a total of divided charge accumulation periods each for accumulating charges to be transferred the plurality of times in each frame period becomes shorter than the minimum controllable period, and wherein the setting unit is implemented by one or more processors and/or circuitry.

Further, according to the present invention, provided is an image capturing apparatus comprising: a photoelectric conversion apparatus having a plurality of pixels each including a photoelectric conversion element that converts incident light into charges and accumulates the charges, and a plurality of first holding portions, that comprises: a control unit that controls a charge accumulation period in the photoelectric conversion elements in units of predetermined minimum controllable period; and a setting unit that sets a charge accumulation period in one frame period; and a lens unit that forms an optical image of a subject on the photoelectric conversion elements, wherein the control unit controls to transfer charges from the photoelectric conversion elements to the plurality of first holding portions in turn a plurality of times during each frame period, and controls the charge accumulation period in the photoelectric conversion elements such that a difference between the set charge accumulation period and a total of divided charge accumulation periods each for accumulating charges to be transferred the plurality of times in each frame period becomes shorter than the minimum controllable period, and wherein the setting unit is implemented by one or more processors and/or circuitry.

Furthermore, according to the present invention, provided is an image capturing apparatus comprising: a photoelectric conversion apparatus having a plurality of pixels each including a photoelectric conversion element that converts incident light into charges and accumulates the charges, and a plurality of first holding portions, that comprises: a control unit that controls a charge accumulation period in the photoelectric conversion elements in units of predetermined minimum controllable period; and a setting unit that sets a charge accumulation period in one frame period; and a processing unit that processes signals corresponding to charges read out from the photoelectric conversion apparatus, wherein the control unit controls to transfer charges from the photoelectric conversion elements to the plurality of first holding portions in turn a plurality of times during each frame period, controls the charge accumulation period in the photoelectric conversion elements such that a difference between the set charge accumulation period and a total of divided charge accumulation periods each for accumulating charges to be transferred the plurality of times in each frame period becomes shorter than the minimum controllable period, and controls sums of the divided charge accumulation periods for accumulating charges to be transferred to the plurality of first holding portions, respectively, to be different from each other, wherein the processing unit performs processing to expand a dynamic range for each pixel based on the signals, and wherein the setting unit and the processing unit is implemented by one or more processors and/or circuitry.

Further, according to the present invention, provided is a control method of a photoelectric conversion apparatus having a plurality of pixels each including a photoelectric conversion element that converts incident light into charges and accumulates the charges, and a plurality of first holding portions, the method comprising: setting a charge accumulation period in one frame period; and controlling a charge accumulation period in the photoelectric conversion elements in units of predetermined minimum controllable period, wherein in the controlling of the charge accumulation period, controlling to transfer charges from the photoelectric conversion elements to the plurality of first holding portions in turn a plurality of times during each frame period, and controlling the charge accumulation period in the photoelectric conversion elements such that a difference between the set charge accumulation period and a total of divided charge accumulation periods each for accumulating charges to be transferred the plurality of times in each frame period becomes shorter than the minimum controllable period.

Further, according to the present invention, provided is a non-transitory computer-readable storage medium, the storage medium storing a program that is executable by the computer, wherein the program includes program code for causing the computer to perform a control method of a photoelectric conversion apparatus having a plurality of pixels each including a photoelectric conversion element that converts incident light into charges and accumulates the charges, and a plurality of first holding portions, the method comprising: setting a charge accumulation period in one frame period; and controlling a charge accumulation period in the photoelectric conversion elements in units of predetermined minimum controllable period, wherein in the controlling of the charge accumulation period, controlling to transfer charges from the photoelectric conversion elements to the plurality of first holding portions in turn a plurality of times during each frame period, and controlling the charge accumulation period in the photoelectric conversion elements such that a difference between the set charge accumulation period and a total of divided charge accumulation periods each for accumulating charges to be transferred the plurality of times in each frame period becomes shorter than the minimum controllable period.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present invention will be described below.

Figure 1:
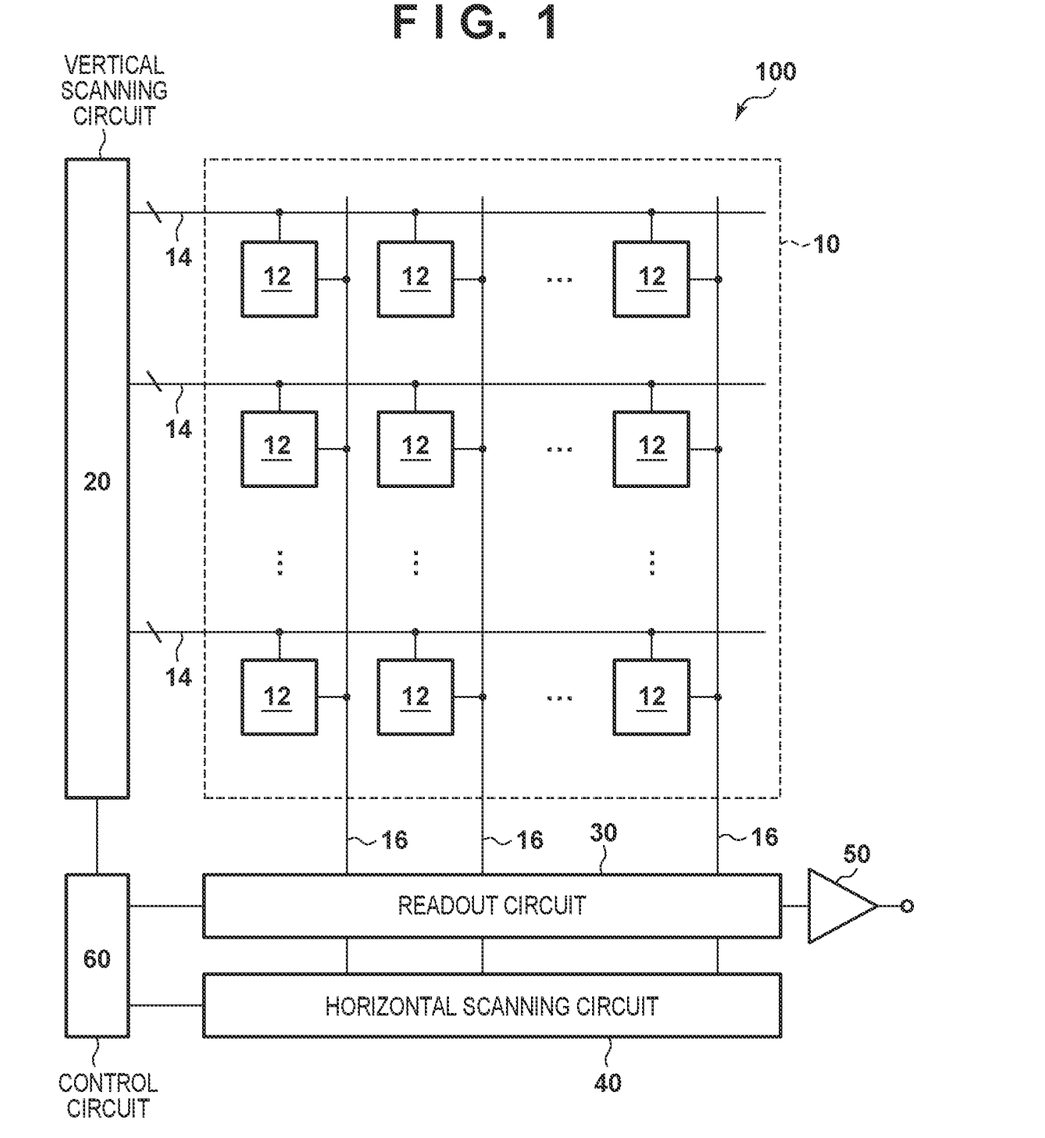
FIG. 1 is a block diagram illustrating a schematic configuration of a photoelectric conversion apparatus according to a first embodiment of the present invention.

FIG. 1 is a block diagram showing a schematic configuration of a photoelectric conversion apparatus 100 according to the first embodiment.

The photoelectric conversion apparatus 100 includes a pixel region 10, a vertical scanning circuit 20, a readout circuit 30, a horizontal scanning circuit 40, an output circuit 50, and a control circuit 60. The pixel region 10 is electrically connected to the vertical scanning circuit 20 and the readout circuit 30. The readout circuit 30 is electrically connected to the horizontal scanning circuit 40 and the output circuit 50. The control circuit 60 is electrically connected to the vertical scanning circuit 20, the readout circuit 30, and the horizontal scanning circuit 40.

The pixel region 10 is provided with a plurality of pixels 12 arranged in a matrix. Each of the plurality of pixels 12 includes a photoelectric conversion unit made of a photoelectric conversion element such as a photodiode, and outputs a pixel signal according to the amount of incident light. Note that the number of rows and columns of the pixel array arranged in the pixel region 10 is not particularly limited. Further, in addition to effective pixels that output pixel signals according to the amount of incident light, the pixel region 10 may include optical black pixels whose photoelectric conversion units are shielded from light, and dummy pixels that do not output signals.

In each row of the pixel region 10, a control line 14 extending in a first direction (horizontal direction in FIG. 1) is arranged. Each of the control lines 14 is connected to the pixels 12 arranged in the first direction, and serves as a common signal line for these pixels 12. In the following description, the first direction in which the control lines 14 extend may be referred to as the row direction or the horizontal direction. Each of control lines 14 may include multiple signal lines. The control lines 14 are connected to the vertical scanning circuit 20.

In each column of the pixel region 10, a vertical output line 16 extending in a second direction (vertical direction in FIG. 1) intersecting the first direction is arranged. Each of the vertical output lines 16 is connected to the pixels 12 arranged in the second direction, and forms a common signal line for these pixels 12. In the following description, the second direction in which the vertical output lines 16 extend may be referred to as the column direction or the vertical direction. The vertical output lines 16 are connected to the readout circuit 30.

The vertical scanning circuit 20 has a function of receiving a control signal from the control circuit 60, generating a control signal for actuating the pixels 12, and outputting it to the pixels 12 via the control lines 14. For the vertical scanning circuit 20, a logic circuit such as a shift register or an address decoder may be used. The pixels 12 in the pixel region 10 in this embodiment can be actuated in a global shutter (GS) mode and a rolling shutter (RS) mode, wherein the mode can be selected from outside the photoelectric conversion apparatus 100 using, for example, an operation unit (not shown).

In the case of the GS mode, the vertical scanning circuit 20 simultaneously outputs a control signal to the control lines 14 of the respective rows, and actuates all the pixels 12 in the pixel region 10 to perform charge accumulation at the same timing. On the other hand, in the case of the RS mode, the vertical scanning circuit 20 sequentially outputs a control signal to the control lines 14 of the respective rows, and actuates the pixels 12 in the pixel region 10 so that charge accumulation is performed sequentially on a row-by-row basis. In either mode, signals are read out row by row from the pixels 12, and the signals read out from the pixels 12 are input to the readout circuit 30 via the vertical output lines 16 arranged for the respective columns of the pixel region 10.

The readout circuit 30 has a function of performing predetermined signal processing, such as amplification processing and addition processing, on the signal read out from the pixels 12. The readout circuit 30 may include signal holding sections, column amplifiers, correlated double sampling (CDS) circuitry, summing circuitry, and the like. Further, the readout circuit 30 may further include other processing circuits such as analog/digital (A/D) conversion circuits as needed.

The control circuit 60 supplies control signals to the vertical scanning circuit 20, readout circuit 30, and horizontal scanning circuit 40 to control their operations and timings. Note that at least some of the control signals supplied to the vertical scanning circuit 20, readout circuit 30, and horizontal scanning circuit 40 may be supplied from outside the photoelectric conversion apparatus 100.

Next, each pixel of the photoelectric conversion apparatus 100 in this embodiment will be explained with reference to FIG. 2.

Figure 2:
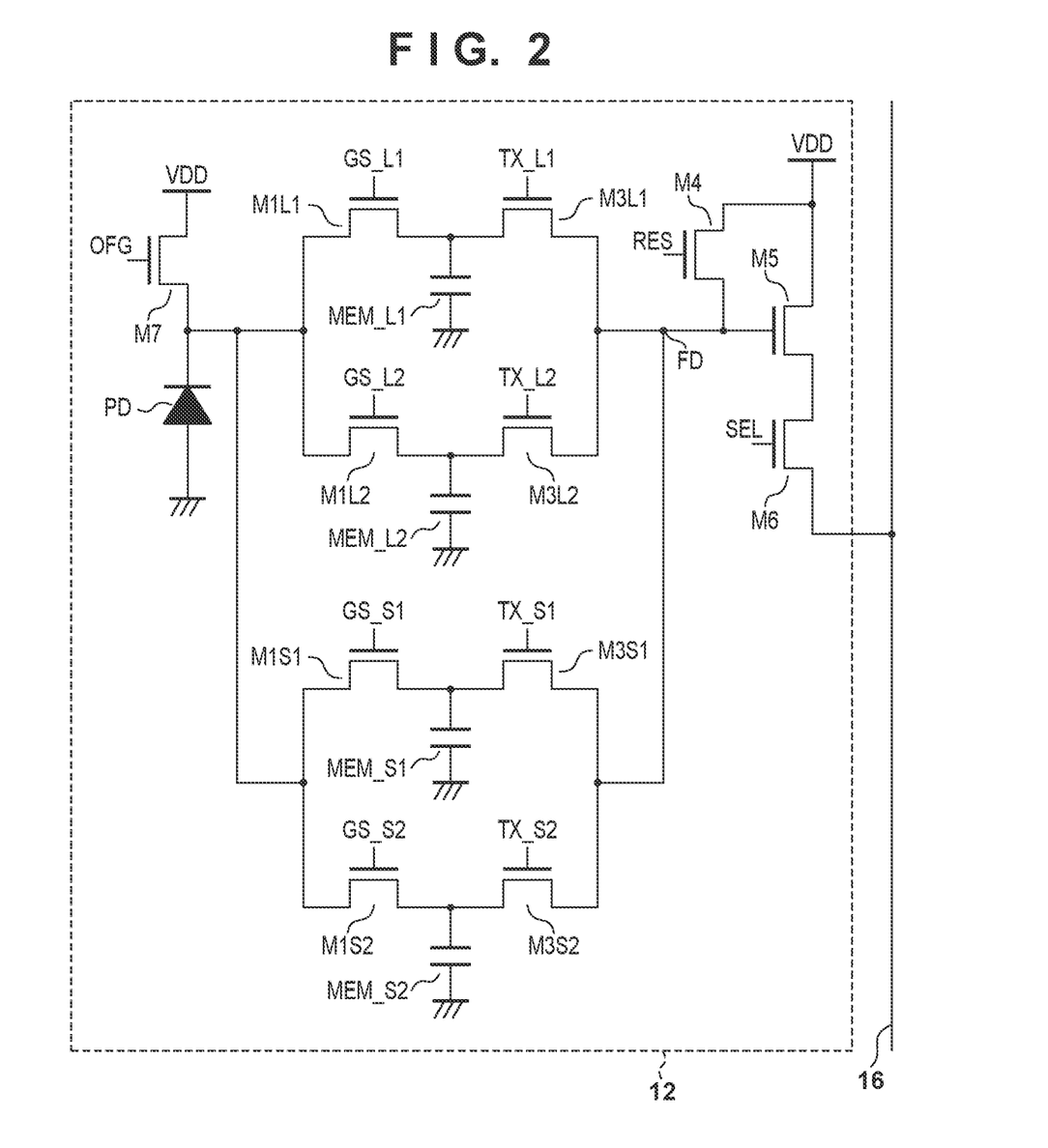
FIG. 2 is an equivalent circuit diagram illustrating a configuration example of a pixel according to the first embodiment.

FIG. 2 is an equivalent circuit diagram illustrating an example of the configuration of each pixel of the photoelectric conversion apparatus 100.

As shown in FIG. 2, each pixel 12 includes a photoelectric conversion unit PD, transfer transistors M1L1, M1L2, M1S1, M1S2, M3L1, M3L2, M3S1, and M3S2. Furthermore, each pixel 12 further includes a reset transistor M4, an amplification transistor M5, a selection transistor M6, and a discharge transistor M7. Each transistor may be constituted by an N-type MOS transistor if, for example, electrons are used as signal charges. Note that each transistor does not necessarily have to be an N-type MOS transistor, and each transistor may be configured as a P-type MOS transistor, and holes may be used as signal charges.

The photoelectric conversion unit PD may be configured by a photoelectric conversion element such as a photodiode, for example. The photoelectric conversion unit PD converts incident light into charges corresponding to the amount of light (photoelectric conversion), and accumulates the generated charges. Further, the photoelectric conversion unit PD has an anode connected to a ground node, and a cathode connected to the sources of the respective transfer transistors M1L1, M1L2, M1S1, M1S2 and the discharge transistor M7.

The drain of the transfer transistor M1L1 is connected to the source of the transfer transistor M3L1. A connection node between the drain of the transfer transistor M1L1 and the source of the transfer transistor M3L1 has a capacitance and functions as a charge holding portion (charge holding portion MEM_L1). The transfer transistor M1L1 has a function as a transfer unit that performs a transfer operation of transferring the charges held in the photoelectric conversion unit PD to the charge holding portion MEM_L1 when turned on.

Similarly, the drain of the transfer transistor M1L2 is connected to the source of the transfer transistor M3L2. A connection node between the drain of the transfer transistor M1L2 and the source of the transfer transistor M3L2 has a capacitance and functions as a charge holding portion (charge holding portion MEM_L2). The transfer transistor M1L2 has a function as a transfer unit that performs a transfer operation of transferring the charges held in the photoelectric conversion unit PD to the charge holding portion MEM_L2 when turned on.

Further, the drain of the transfer transistor M1S1 is connected to the source of the transfer transistor M3S1. A connection node between the drain of the transfer transistor M1S1 and the source of the transfer transistor M3S1 has a capacitance and functions as a charge holding portion (charge holding portion MEM_S1). The transfer transistor M1S1 has a function as a transfer unit that performs a transfer operation of transferring the charges held in the photoelectric conversion unit PD to the charge holding portion MEM_S1 when turned on.

Similarly, the drain of the transfer transistor M1S2 is connected to the source of the transfer transistor M3S2. A connection node between the drain of the transfer transistor M1S2 and the source of the transfer transistor M3S2 has a capacitance and functions as a charge holding portion (charge holding portion MEM_S2). The transfer transistor M1S2 has a function as a transfer unit that performs a transfer operation of transferring the charges held in the photoelectric conversion unit PD to the charge holding portion MEM_S2 when turned on.

The drains of the respective transfer transistors M3L1, M3L2, M3S1, and M3S2 are connected to the source of the reset transistor M4 and the gate of the amplification transistor M5. A connection node between the drains of the transfer transistors M3L1, M3L2, M3S1, and M3S2, the source of the reset transistor M4, and the gate of the amplification transistor M5 is a so-called floating diffusion portion FD. The floating diffusion portion FD has a capacitance (floating diffusion capacitance) and functions as a charge holding portion.

The transfer transistor M3L1 has a function as a transfer unit that performs a transfer operation of transferring the charges held in the charge holding portion MEM_L1 to the floating diffusion portion FD when turned on.

The transfer transistor M3L2 has a function as a transfer unit that performs a transfer operation of transferring the charges held in the charge holding portion MEM_L2 to the floating diffusion portion FD when turned on.

The transfer transistor M3S1 has a function as a transfer unit that performs a transfer operation of transferring the charges held in the charge holding portion MEM_S1 to the floating diffusion portion FD when turned on.

The transfer transistor M3S2 has a function as a transfer unit that performs a transfer operation of transferring the charges held in the charge holding portion MEM_S2 to the floating diffusion portion FD when turned on.

The reset transistor M4 has a function as a reset unit that performs a reset operation of resetting the floating diffusion portion FD to a voltage according to the voltage VDD when turned on.

The discharge transistor M7 has a function as an overflow drain that discharges the charges held in the photoelectric conversion unit PD when turned on. That is, the discharge transistor M7 has a function as a reset unit that performs a reset operation of resetting the photoelectric conversion unit PD to a voltage corresponding to the voltage VDD when turned on.

The selection transistor M6 has a function as a selection unit that selects whether or not to output a signal corresponding to the source voltage of the amplification transistor M5 to the vertical output line 16 as a pixel signal.

The drain of the reset transistor M4, the drain of the amplification transistor M5, and the drain of the discharge transistor M7 are connected to a power supply voltage line (voltage VDD). Note that any two or three of the voltage supplied to the drain of the reset transistor M4, the voltage supplied to the drain of the amplification transistor M5, and the voltage supplied to the drain of discharge transistor M7 may be the same, or all of the voltages may be different from each other. The source of the amplification transistor M5 is connected to the drain of the selection transistor M6, and the source of the selection transistor M6 is connected to the vertical output line 16.

The amplification transistor M5 has a configuration in which the voltage VDD is supplied to its drain, a bias current is supplied to its source from a current source (not shown) via the selection transistor M6, and constitutes an amplification unit (source follower circuit) whose input node is the gate of the amplification transistor M5. As a result, the amplification transistor M5 outputs a signal corresponding to the potential of the floating diffusion portion FD to the vertical output line 16 via the selection transistor M6. In this sense, it can be said that the floating diffusion portion FD, the amplification transistor M5, and the selection transistor M6 constitute an output unit that outputs a signal according to the amount of charges held in the floating diffusion portion FD. Note that although FIG. 2 shows a configuration in which four transfer portions (transfer transistors M3L1, M3L2, M3S1, M3S2) share one floating diffusion portion FD or output unit, the floating diffusion portion FD or the output unit may be formed for each of the four transfer portions.

Each of the control lines 14 shown in FIG. 1 contains eleven signal lines connected to the gates of the transfer transistors M1L1, M1L2, M1S1, M1S2, M3L1, M3L2, M3S1, M3S2, the reset transistor M4, the selection transistor M6, and the discharge transistor M7, respectively. A control signal GS_L1 is output from the vertical scanning circuit 20 to the signal line connected to the gate of the transfer transistor M1L1, and a control signal GS_L2 is output from the vertical scanning circuit 20 to the signal line connected to the gate of the transfer transistor M1L2. Further, a control signal GS_S1 is output from the vertical scanning circuit 20 to the signal line connected to the gate of the transfer transistor M1S1, and a control signal GS_S2 is output from the vertical scanning circuit 20 to the signal line connected to the gate of the transfer transistor M1S2.

Further, a control signal TX_L1 is output from the vertical scanning circuit 20 to the signal line connected to the gate of the transfer transistor M3L1, and a control signal TX_L2 is output from the vertical scanning circuit 20 to the signal line connected to the gate of the transfer transistor M3L2. Furthermore, a control signal TX_S1 is output from the vertical scanning circuit 20 to the signal line connected to the gate of the transfer transistor M3S1, and a control signal TX_S2 is output from the vertical scanning circuit 20 to the signal line connected to the gate of the transfer transistor M3S2.

A control signal RES is output from the vertical scanning circuit 20 to the signal line connected to the gate of the reset transistor M4. A control signal SEL is output from the vertical scanning circuit 20 to the signal line connected to the gate of the selection transistor M6. A control signal OFG is output from the vertical scanning circuit 20 to the signal line connected to the gate of the discharge transistor M7.

In a case where each transistor is an N-type transistor, when a high-level control signal is supplied from the vertical scanning circuit 20, the corresponding transistor is turned on, and when a low-level control signal is supplied from the vertical scanning circuit 20, the corresponding transistor is turned off.

Figure 3:
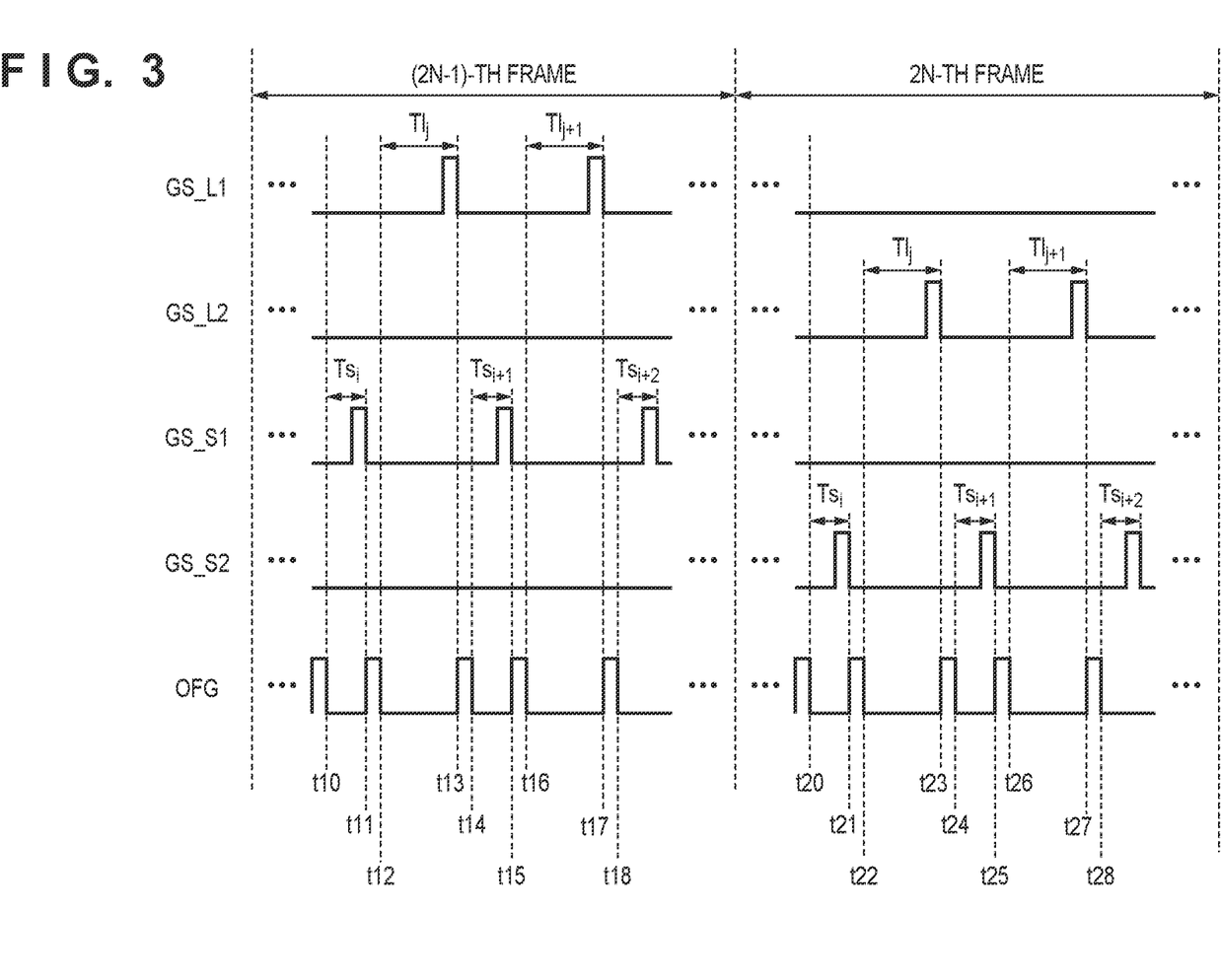
FIG. 3 is a timing chart illustrating a concept of charge accumulation control in the first embodiment.
Figure 4:
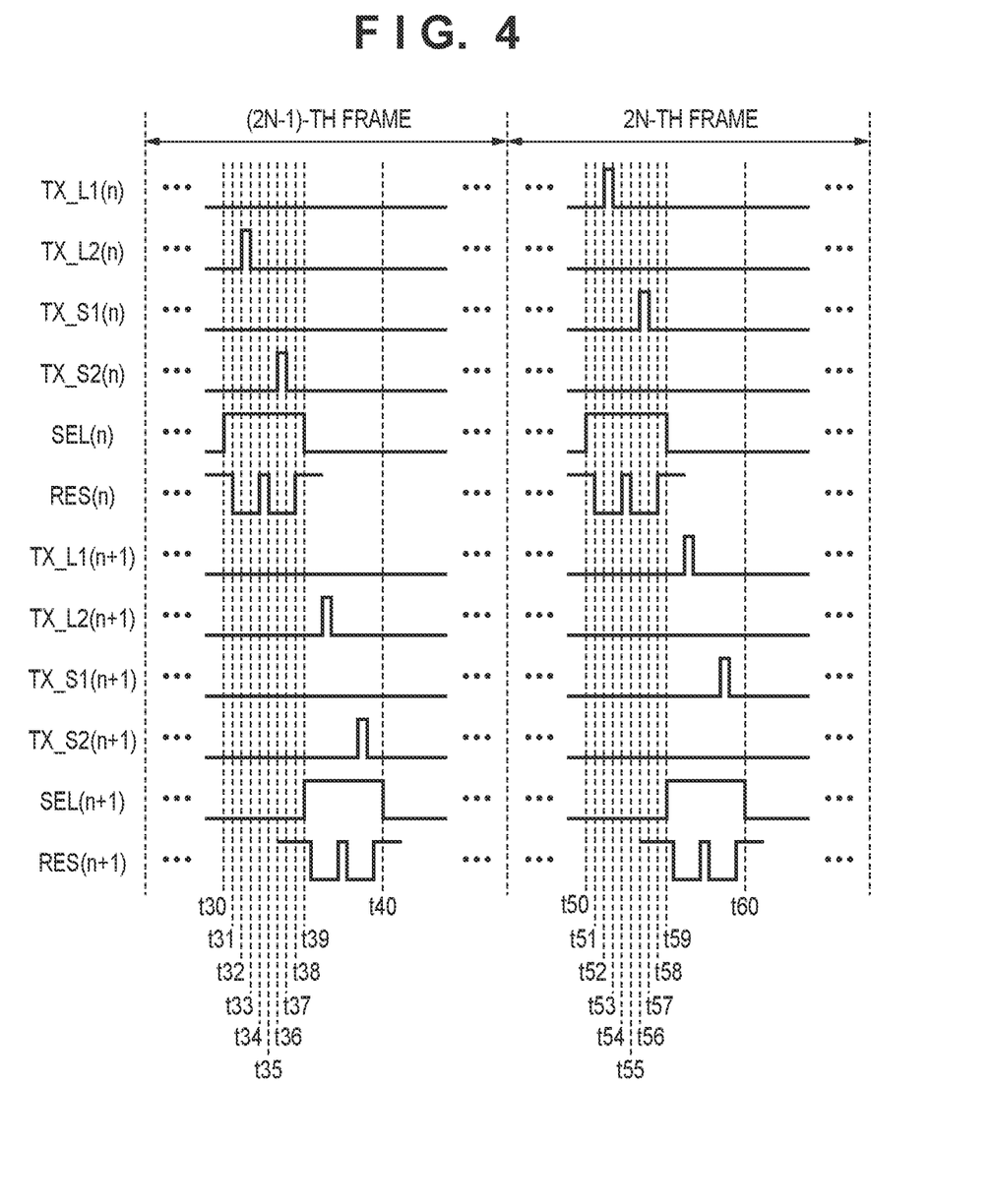
FIG. 4 is a timing chart illustrating signal readout control in the first embodiment.

Next, a method of driving the photoelectric conversion apparatus 100 in the GS mode in this embodiment will be described using FIGS. 3 and 4. FIG. 3 is a timing chart illustrating the concept of charge accumulation control of pixels, and FIG. 4 is a timing chart illustrating charge readout control.

FIG. 3 shows temporal changes of the control signals GS_L1, GS_L2, GS_S1, GS_S2, and OFG supplied to the transfer transistors M1L1, M1L2, M1S1, M1S2 and the discharge transistor M7 in the (2N−1)-th frame and the 2N-th frame. Here, N is an integer of 1 or more. Furthermore, when each control signal is at a high level, the corresponding transistor becomes active (ON state). Note that since the control is in the GS mode, the actuation and timing related to charge accumulation control are the same for the pixels 12 in all rows.

In addition, in each frame, charge accumulation control is performed with a charge accumulation period Ts (divided charge accumulation period repeated a plurality of times (Ks times) and a charge accumulation period Tl (divided charge accumulation period) repeated a plurality of times (Kl times). The charge accumulation period Ts is a period for storing charges in the charge holding portion MEM_S1 or the charge holding portion MEM_S2, and the charge accumulation period Tl is a period for storing charges in the charge holding portion MEM_L1 or the charge holding portion MEM_L2.

In FIG. 3, the operation of the i-th charge accumulation period $Ts_i$ and the (i+1)-th charge accumulation period $Ts_{i+1}$ among the Ks times of charge accumulation periods Ts, and the operation of the j-th charge accumulation period $Tl_j$ and the (j+1)-th charge accumulation period $Tl_{j+1}$ among the Kl times of charge accumulation periods Tl, are shown. Here, i is an integer greater than or equal to 1 and less than or equal to Ks−2, and j is an integer greater than or equal to 1 and less than or equal to Kl−1. Note that the number of times Ks and Kl can be set as appropriate depending on the total charge accumulation period within one frame period, and the number of times Ks and Kl may be the same or different.

First, the charge accumulation control in an odd frame ((2N−1)-th frame) will be explained. In odd frames, charges generated in each photoelectric conversion unit PD are accumulated in the charge holding portions MEM_L1 and MEM_S1, and signals are read out based on the charges accumulated in the charge holding portions MEM_L2 and MEM_S2.

First, just before time t10, the control signal OFG is set to the high level. The discharge transistor M7 is turned on in response to the high-level control signal OFG, and the photoelectric conversion unit PD is reset to a potential according to the voltage VDD.

At time t10, the vertical scanning circuit 20 controls the control signal OFG to change from the high level to a low level. This turns off the discharge transistor M7 and releases the reset state of the photoelectric conversion unit PD. That is, the charge accumulation period $Ts_i$ in the photoelectric conversion unit PD is started at the timing when the control signal OFG changes from the high level to the low level. While the discharge transistor M7 is off, the photoelectric conversion unit PD photoelectrically converts the incident light and accumulates the generated charges.

In the period from a predetermined timing after time t10 to time t11, the vertical scanning circuit 20 controls the control signal GS_S1 to the high level. As a result, the transfer transistor M1S1 is turned on, and the charges accumulated in the photoelectric conversion unit PD is transferred to the charge holding portion MEM_S1. At time t11 when the transfer transistor M1S1 is turned off, the charge accumulation period $Ts_i$ of the photoelectric conversion unit PD is ended. That is, the period from time t10 to time t11 is the charge accumulation period $Ts_i$.

After time t11, the vertical scanning circuit 20 controls the control signal OFG to change from the low level to the high level. As a result, the discharge transistor M7 is turned on, and the photoelectric conversion unit PD is reset to a potential according to the voltage VDD.

At the subsequent time t12, the vertical scanning circuit 20 controls the control signal OFG to change from the high level to the low level. This turns off the discharge transistor M7 and releases the reset state of the photoelectric conversion unit PD. That is, the charge accumulation period $Tl_j$ of the photoelectric conversion unit PD is started at the timing when the control signal OFG changes from the high level to the low level. While the discharge transistor M7 is off, the photoelectric conversion unit PD photoelectrically converts the incident light and accumulates the generated charges.

Note that here, the photoelectric conversion unit PD is reset by turning on the discharge transistor M7, but if the configuration is such that no charge remains in the photoelectric conversion unit PD during transfer, resetting of the photoelectric conversion unit PD by the discharge transistor M7 may be omitted. In that case, the timing (time t11) at which the transfer transistor (transfer transistor M1S1 in this case) is turned off is the start of the charge accumulation period $Tl_j$ of the photoelectric conversion unit PD. The same applies to the other charge accumulation periods Ts and Tl. Complete transfer of charges from photoelectric conversion unit PD to the charge holding portions MEM_L1, MEM_L2, MEM_S1, MEM_S2 may be realized by designing the potentials of the photoelectric conversion unit PD, transfer transistors M1L1, M1L2, M1S1, M1S2, charge holding portions MEM_L1, MEM_L2, MEM_S1, MEM_S2.

In the period from a predetermined timing after time t12 to time t13, the vertical scanning circuit 20 controls to change the control signal GS_L1 to the high level. As a result, the transfer transistor M1L1 is turned on, and the charges accumulated in the photoelectric conversion unit PD are transferred to the charge holding portion MEM_L1. At time t13 when the transfer transistor M1L1 is turned off, the charge accumulation period $Tl_j$ of the photoelectric conversion unit PD is ended. That is, the period from time t12 to time t13 is the charge accumulation period $Tl_j$.

Thereafter, the charge accumulation period Ts and the charge accumulation period Tl are repeated a predetermined number of times in the same manner as in the period from time t10 to time t13. For example, as shown in FIG. 3, the period from time t14 to time t15 is a charge accumulation period $Ts_{i+1}$, the period from time t16 to time t17 is a charge accumulation period $Tl_{j+1}$, and the period from time t18 is a charge accumulation period $Ts_{i+2}$.

Dividing and transferring the signal charges from the photoelectric conversion unit PD to the charge holding portions MEM_L1, MEM_L2, MEM_S1, and MEM_S2 in one frame period in this manner is hereinafter referred to as "time division transfer". In this way, in odd frames, charge accumulation control constituting Ks times of charge accumulation periods Ts and Kl times of charge accumulation periods Tl is performed. As a result, the charge holding portion MEM_S1 holds the charges generated by the photoelectric conversion unit PD during the charge accumulation period Tshort, which is the sum of Ks times of the charge accumulation periods Ts from a charge accumulation period $Ts_1$ to a charge accumulation period $TS_{Ks}$. In addition, the charge holding portion MEM_L1 holds the charges generated by the photoelectric conversion unit PD during the charge accumulation period Tlong, which is the sum of Kl times of the charge accumulation periods Tl from a charge accumulation period $Tl_1$ to a charge accumulation period $Tl_{Kl}$.

Next, the charge accumulation control in an even frame (2N-th frame) will be explained. In even frames, charges generated in each photoelectric conversion unit PD are accumulated in the charge holding portions MEM_L2 and MEM_S2, and signals are read out based on the charges accumulated in the charge holding portions MEM_L1 and MEM_S1.

First, just before time t20, the control signal OFG is set to the high level. The discharge transistor M7 is turned on in response to the high-level control signal OFG, and the photoelectric conversion unit PD is reset to a potential according to the voltage VDD.

At time t20, the vertical scanning circuit 20 controls the control signal OFG to change from the high level to the low level. This turns off the discharge transistor M7 and releases the reset state of the photoelectric conversion unit PD. That is, the charge accumulation period $Ts_i$ in the photoelectric conversion unit PD is started at the timing when the control signal OFG changes from the high level to the low level. While the discharge transistor M7 is off, the photoelectric conversion unit PD photoelectrically converts the incident light and accumulates the generated charges.

In the period from a predetermined timing after time t20 to time t21, the vertical scanning circuit 20 controls the control signal GS_S2 to the high level. As a result, the transfer transistor M1S2 is turned on, and the charges accumulated in the photoelectric conversion unit PD is transferred to the charge holding portion MEM_S2. At time t21 when the transfer transistor M1S2 is turned off, the charge accumulation period $Ts_i$ of the photoelectric conversion unit PD is ended. That is, the period from time t20 to time t21 is the charge accumulation period $Ts_i$.

After time t21, the vertical scanning circuit 20 controls the control signal OFG to change from the low level to the high level. As a result, the discharge transistor M7 is turned on, and the photoelectric conversion unit PD is reset to the potential according to the voltage VDD.

At the subsequent time t22, the vertical scanning circuit 20 controls the control signal OFG to change from the high level to the low level. This turns off the discharge transistor M7 and releases the reset state of the photoelectric conversion unit PD. That is, the charge accumulation period $Tl_j$ of the photoelectric conversion unit PD is started at the timing when the control signal OFG changes from the high level to the low level. While the discharge transistor M7 is off, the photoelectric conversion unit PD photoelectrically converts the incident light and accumulates the generated charges.

In the period from a predetermined timing after time t22 to time t23, the vertical scanning circuit 20 controls to change the control signal GS_L2 to the high level. As a result, the transfer transistor M1L2 is turned on, and the charges accumulated in the photoelectric conversion unit PD are transferred to the charge holding portion MEM_L2. At time t23 when the transfer transistor M1L2 is turned off, the charge accumulation period $Tl_j$ of the photoelectric conversion unit PD is ended. That is, the period from time t22 to time t23 is the charge accumulation period $Tl_j$.

Thereafter, the charge accumulation period Ts and the charge accumulation period Tl are repeated a predetermined number of times in the same manner as in the period from time t20 to time t23. For example, as shown in FIG. 3, the period from time t24 to time t25 is a charge accumulation period $Ts_{i+1}$, the period from time t26 to time t27 is a charge accumulation period $Tl_{j+1}$, and the period from time t28 is a charge accumulation period $Ts_{i+2}$.

In this way, charge accumulation control constituting Ks times of charge accumulation periods Ts and Kl times of charge accumulation periods Tl is performed even in even frames. As a result, the charge holding portion MEM_S2 holds the charges generated by the photoelectric conversion unit PD during the charge accumulation period Tshort, which is the sum of Ks times of the charge accumulation periods Ts from a charge accumulation period $Ts_1$ to a charge accumulation period $Ts_{Ks}$. In addition, the charge holding portion MEM_L2 holds the charges generated in the photoelectric conversion unit PD during the charge accumulation period Tlong, which is the sum of Kl times of the charge accumulation periods Tl from a charge accumulation period $Tl_1$ to a charge accumulation period $Tl_{Kl}$.

FIG. 4 shows temporal transition of the control signals TX_L1, TX_L2, TX_S1, TX_S2, RES and SEL, which are supplied to the transfer transistors M3L1, M3L2, M3S1, M3S2, reset transistor M4, and selection transistor M6 in the (2N−1)-th frame and the 2N-th frame. When each control signal is at the high level, the corresponding transistor becomes active (ON state). Note that even in the GS mode, the readout operation of pixel signals is performed sequentially row by row, and in FIG. 4, the control signals supplied to the pixels 12 in the n-th row and the control signals supplied to the pixels 12 in the (n+1)-th row are shown. The control signals supplied to the pixels 12 in the n-th row are marked with (n), and the control signals supplied to the pixels 12 in the (n+1)-th row are marked with (n+1).

First, a readout operation in an odd frame ((2N−1)-th frame) will be explained. In odd frames, as described above, a readout operation of signals based on the charges stored in the charge holding portion MEM_L2 and the charge holding portion MEM_S2 is performed. In the (2N−1)-th frame, the charge holding portion MEM_L2 and the charge holding portion MEM_S2 of each pixel 12 hold the charges accumulated in the (2N−2)-th frame (not shown). Note that the readout operation for each frame can be performed in parallel with the above-described exposure operation.

Immediately before time t30, it is assumed that the control signals TX_L1(n), TX_L2(n), TX_S1(n), TX_S2(n), and SEL(n) are at the low level, and the control signal RES(n) is at the high level.

At time t30, the vertical scanning circuit 20 controls the control signal SEL(n) to change from the low level to the high level. As a result, the selection transistors M6 of the pixels 12 in the n-th row are turned on, and the amplification transistors M5 of the pixels 12 in the respective columns of the n-th row are connected to the vertical output lines 16 of the corresponding columns via the selection transistors M6, and the pixels 12 become a selected state in which pixel signals can be read out. At this time, the reset transistors M4 are on, and the floating diffusion portions FD are reset to a potential according to the voltage VDD. As a result, signals corresponding to the reset potentials of the floating diffusion portions FD are output to the vertical output lines 16.

At the subsequent time t31, the vertical scanning circuit 20 controls the control signal RES(n) to change from the high level to the low level. This turns off the reset transistors M4 and releases the reset state of the floating diffusion portions FD. The voltages of the vertical output lines 16 that settle after turning off the reset transistors M4 are the reset level voltages VRES of the pixels 12. In this way, the reset level voltages VRES of the pixels 12 are read out to the vertical output lines 16.

During the subsequent period from time t32 to time t33, the vertical scanning circuit 20 controls the control signal TX_L2(n) to change from the low level to the high level. As a result, the transfer transistors M3L2 of the pixels 12 in the n-th row are turned on, and the charges held in the charge holding portions MEM_L2 are transferred to the floating diffusion portions FD. Accordingly, the floating diffusion portions FD become to have potentials corresponding to the amounts of charges transferred from the charge holding portions MEM_L2, and voltages corresponding to the potentials of the floating diffusion portions FD are output to the vertical output lines 16. The voltages of the vertical output lines 16 that settle after the transfer transistors M3L2 are turned off at time t33 are the signal level voltages VSIG of the pixels 12. In this way, the signal level voltages VSIG of the pixels 12 based on the charges held in the charge holding portions MEM_L2 are read out to the vertical output lines 16.

The difference between the reset level voltage VRES and the signal level voltage VSIG obtained in this way, i.e., |VSIG−VRES|, is a physical quantity corresponding to the amount of charge held in the charge holding portion MEM_L2 of each pixel 12.

At the subsequent time t34, the vertical scanning circuit 20 controls the control signal RES(n) to change from the low level to the high level. As a result, the reset transistors M4 of the pixels 12 in the n-th row are turned on, and the floating diffusion portions FD are reset to a potential according to the voltage VDD. Signals corresponding to the reset potentials of the floating diffusion portions FD are output to the vertical output lines 16.

At the subsequent time t35, the vertical scanning circuit 20 controls the control signal RES(n) to change from the high level to the low level. This turns off the reset transistors M4 and releases the reset state of the floating diffusion portions FD. The voltages of the vertical output lines 16 that settle after turning off the reset transistors M4 are the reset level voltages VRES of the pixels 12. In this way, the reset level voltages VRES of the pixels 12 are read out to the vertical output lines 16.

During the subsequent period from time t36 to time t37, the vertical scanning circuit 20 controls the control signal TX_S2(n) to change from the low level to the high level. As a result, the transfer transistors M3S2 of the pixels 12 in the n-th row are turned on, and the charges held in the charge holding portions MEM_S2 are transferred to the floating diffusion portions FD. Accordingly, the floating diffusion portions FD become to have potentials corresponding to the amounts of charges transferred from the charge holding portions MEM_S2, and voltages corresponding to the potentials of the floating diffusion portions FD are output to the vertical output lines 16. The voltages of the vertical output lines 16 that settle after the transfer transistors M3S2 are turned off at time t37 are the signal level voltages VSIG of the pixels 12. In this way, the signal level voltages VSIG of the pixels 12 based on the charges held in the charge holding portions MEM_S2 are read out to the vertical output lines 16.

The difference between the reset level voltage VRES and the signal level voltage VSIG obtained in this way, i.e., |VSIG−VRES|, is a physical quantity corresponding to the amount of charge held in the charge holding portion MEM_S2 of each pixel 12.

At the subsequent time t38, the vertical scanning circuit 20 controls the control signal RES(n) to change from the low level to the high level. As a result, the reset transistors M4 of the pixels 12 in the n-th row are turned on, and the floating diffusion portions FD are reset to a potential according to the voltage VDD.

At the subsequent time t39, the vertical scanning circuit 20 controls the control signal SEL(n) to change from the high level to the low level. As a result, the selection transistors M6 of the pixels 12 in the n-th row are turned off, and the selection of the n-th row is released.

In addition, during a period from time t39 to time t40, similarly to the period from time t30 to time t39, from the pixels 12 in the (n+1)-th row, signals based on charges held in the charge holding portions MEM_L2 and the charge holding portions MEM_S2 are read out. The readout operation of the pixels 12 in other rows is performed in the same way.

Next, a readout operation in an even frame (2N-th frame) will be explained. In even frames, as described above, a readout operation of signals based on the charges stored in the charge holding portion MEM_L1 and the charge holding portion MEM_S1 is performed. In the 2N-th frame, the charge holding portion MEM_L1 and the charge holding portion MEM_S1 of each pixel 12 hold the charges accumulated in the (2N−1)-th frame.

Immediately before time t50, it is assumed that the control signals TX_L1(n), TX_L2(n), TX_S1(n), TX_S2(n), and SEL(n) are at the low level, and control signal RES(n) is at the high level.

At time t50, the vertical scanning circuit 20 controls the control signal SEL(n) to change from the low level to the high level. As a result, the selection transistors M6 of the pixels 12 in the n-th row are turned on, and the amplification transistors M5 of the pixels 12 in the respective columns of the n-th row are connected to the vertical output lines 16 of the corresponding columns via the selection transistors M6, and the pixels 12 become a selected state in which pixel signals can be read out. At this time, the reset transistors M4 are on, and the floating diffusion portions FD are reset to a potential according to the voltage VDD. As a result, signals corresponding to the reset potentials of the floating diffusion portions FD are output to the vertical output lines 16.

At the subsequent time t51, the vertical scanning circuit 20 controls the control signal RES(n) to change from the high level to the low level. This turns off the reset transistors M4 and releases the reset state of the floating diffusion portions FD. The voltages of the vertical output lines 16 that settle after turning off the reset transistors M4 are the reset level voltages VRES of the pixels 12. In this way, the reset level voltages VRES of the pixels 12 are read out to vertical output lines 16.

During the subsequent period from time t52 to time t53, the vertical scanning circuit 20 controls the control signal TX_L1(n) to change from the low level to the high level. As a result, the transfer transistors M3L1 of the pixels 12 in the n-th row are turned on, and the charges held in the charge holding portions MEM_L1 are transferred to the floating diffusion portions FD. Accordingly, the floating diffusion portions FD become to have potentials corresponding to the amounts of charges transferred from the charge holding portions MEM_L1, and voltages corresponding to the potentials of the floating diffusion portions FD are output to the vertical output lines 16. The voltages of the vertical output lines 16 that settle after the transfer transistor M3L1 are turned off at time t53 are the signal level voltages VSIG of the pixels 12. In this way, the signal level voltages VSIG of the pixels 12 based on the charges held in the charge holding portions MEM_L1 are read out to the vertical output lines 16.

The difference between the reset level voltage VRES and the signal level voltage VSIG obtained in this way, i.e., |VSIG−VRES|, is a physical quantity corresponding to the amount of charge held in the charge holding portion MEM_L1 of each pixel 12.

At the subsequent time t54, the vertical scanning circuit 20 controls the control signal RES(n) to change from the low level to the high level. As a result, the reset transistors M4 of the pixels 12 in the n-th row are turned on, and the floating diffusion portions FD are reset to a potential according to the voltage VDD. Signals corresponding to the reset potentials of the floating diffusion portions FD are output to the vertical output lines 16.

At the subsequent time t55, the vertical scanning circuit 20 controls the control signal RES(n) to change from the high level to the low level. This turns off the reset transistors M4 and releases the reset state of the floating diffusion portions FD. The voltages of the vertical output lines 16 that settle after turning off the reset transistors M4 are the reset level voltages VRES of the pixels 12. In this way, the reset level voltages VRES of the pixels 12 are read out to the vertical output lines 16.

During the subsequent period from time t56 to time t57, the vertical scanning circuit 20 controls the control signal TX_S1(n) to change from the low level to the high level. As a result, the transfer transistors M3S1 of the pixels 12 in the n-th row are turned on, and the charges held in the charge holding portions MEM_S1 are transferred to the floating diffusion portions FD. Accordingly, the floating diffusion portions FD become to have potentials corresponding to the amounts of charges transferred from the charge holding portions MEM_S1, and voltages corresponding to the potentials of the floating diffusion portions FD are output to the vertical output lines 16. The voltages of the vertical output lines 16 that settle after the transfer transistors M3S1 are turned off at time t57 are the signal level voltages VSIG of the pixels 12. In this way, the signal level voltages VSIG of the pixels 12 based on the charges held in the charge holding portions MEM_S1 are read out to the vertical output lines 16.

The difference between the reset level voltage VRES and the signal level voltage VSIG obtained in this way, i.e., |VSIG−VRES|, is a physical quantity corresponding to the amount of charge held in the charge holding portion MEM_S1 of each pixel 12.

At the subsequent time t58, the vertical scanning circuit 20 controls the control signal RES(n) to change from the low level to the high level. As a result, the reset transistors M4 of the pixels 12 in the n-th row are turned on, and the floating diffusion portions FD are reset to a potential according to the voltage VDD.

At the subsequent time t59, the vertical scanning circuit 20 controls the control signal SEL(n) to change from the high level to the low level. As a result, the selection transistors M6 of the pixels 12 in the n-th row are turned off, and the selection of the n-th row is released.

In addition, during a period from time t59 to time t60, similarly to the period from time t50 to time t59, from the pixels 12 in the (n+1)-th row, signals based on charges held in the charge holding portions MEM_L1 and the charge holding portions MEM_S1 are read out. The readout operation of the pixels 12 in other rows is performed in the same way.

Note that in the actuation examples described using FIGS. 3 and 4, the length of the charge accumulation period Tlong and the length of the charge accumulation period Tshort may be the same, but are preferably different. By changing the length of the charge accumulation period Tlong and the length of the charge accumulation period Tshort, it becomes possible to acquire two types of images with different effective exposure amounts in the same frame. By correcting the signal of one of the two types of images acquired in this way according to the ratio between the lengths of charge accumulation periods and combining it with the signal of the other image to form a single image, an image with high dynamic range (HDR image) can be obtained. The HDR image synthesis process may be performed in a signal processing unit within the photoelectric conversion apparatus, or may be performed in an external signal processing apparatus.

In addition, in this embodiment, the charge accumulation period Tshort is divided into Ks times of charge accumulation periods Ts, and the charge accumulation period Tlong is divided into Kl times of charge accumulation periods Tl, and the pixels 12 are actuated by altering between these charge accumulation periods Ts and Tl. By distributing the charge accumulation periods within the frame period in this manner, it is possible to suppress the periods during which charge is accumulated from becoming uneven within the frame period. Accordingly, compared to the case where the pixel 12 is actuated consecutively with the charge accumulation period Tshort and then the charge accumulation period Tlong, it is possible to suppress jitter between frame images during moving image shooting. Particularly, a remarkable effect can be obtained in a case where shooting a subject moving at high speed in the screen or a blinking light source. Furthermore, since the temporal centers of gravity of the charge accumulation period Tshort and the charge accumulation period Tlong can be brought close to each other, a high-quality composite image can be obtained.

Furthermore, the pixel 12 of the photoelectric conversion apparatus 100 in this embodiment includes charge holding units that hold charges in the previous frame as well as charge holding units that store charges in real time. Therefore, even while charges are being accumulated, it is possible to read out signals based on the charges accumulated in the previous frame, reducing the time during which signals cannot be obtained in each frame period, and making it possible to obtain seamless moving images.

In this way, according to this embodiment, it is possible to obtain a high-quality moving image with a high dynamic range.

Up to this point, an example has been described in which the charge accumulation period Ts and the charge accumulation period Tl are constant in one frame period. However, if the charge accumulation period Ts and the charge accumulation period Tl are constant, the charge accumulation period in one frame period may not be the desired charge accumulation period. An example of a case where the desired charge accumulation period is not achieved and a method of adjusting the charge accumulation period will be described below.

FIGS. 5A to 5D are timing diagrams showing the relationship between the total charge accumulation period in one frame period and a desired charge accumulation period set by the user. In each of FIGS. 5A to 5D, the horizontal axis indicates time, and MEM_S in the upper portion shows the charge accumulation periods corresponding to the charge holding portion MEM_S1 and charge holding portion MEM_S2 in FIG. 2. Furthermore, MEM_L in the lower portion shows the charge accumulation periods corresponding to the charge holding portion MEM_L1 and the charge holding portion MEM_L2 in FIG. 2. Note that, for convenience of explanation, FIGS. 5A to 5D exclude the period during which the discharge transistor M7 is turned on by the control signal OFG.

Further, Texp represents the desired charge accumulation period set in the photoelectric conversion apparatus 100 by the user. Here, an example is taken in which the user sets the charge accumulation period, however, for example, in an embedded system, the control system or the like may set the charge accumulation period using a predetermined method based on, for example, a photometric value or the like.

The charge accumulation period is generally set to an integral multiple of the minimum controllable period Tmin (predetermined minimum controllable period). This minimum controllable period Tmin is, for example, a cycle of a system clock signal, a horizontal synchronization period, or the like. In a case of performing time-division transfer in which the charge accumulation period for each charge storage unit is set constant and the charge accumulation period Ts and charge accumulation period Tl are altered, the product of the number of time-division transfers and this minimum controllable period Tmin is the minimum period of time that can be changed in charge accumulation control involving time-division transfer. Therefore, even if the charge accumulation period Ts and the charge accumulation period Tl are set so as to be as close as possible to the desired charge accumulation period Texp, an error exceeding the minimum controllable period Tmin may occur.

Figure 5A:
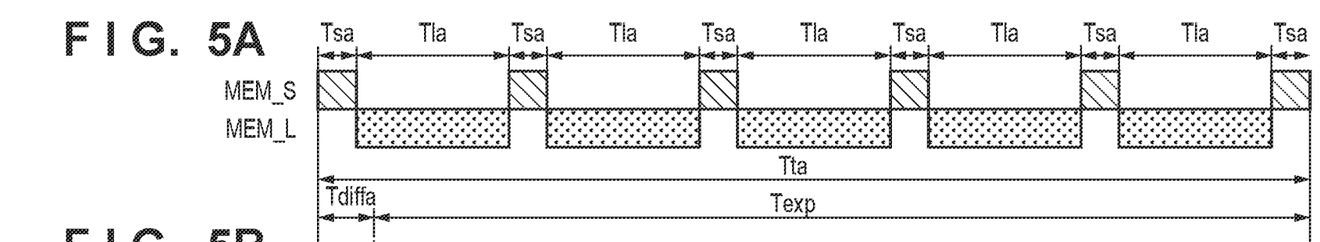
FIGS. 5A to 5D are timing charts illustrating charge accumulation control in the first and second embodiments.

FIG. 5A is an example in which the charge accumulation period for transferring charges to the charge holding portion MEM_S1 and charge holding portion MEM_S2 is Tsa, and the charge accumulation period for transferring charges to the charge holding portion MEM_L1 and the charge holding portion MEM_L2 is Tla. At this time, the total charge accumulation period in one frame period is Tta, and it is assumed that the total charge accumulation period Tta in one frame period is longer than the desired charge accumulation period Texp, and an error Tdiffa exceeding the minimum controllable period Tmin occurs.

Figure 5B:
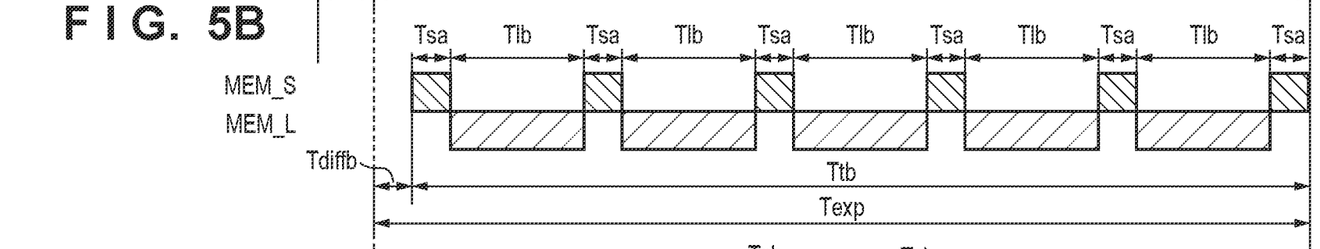

FIG. 5B is an example in which the charge accumulation period for transferring charges to the charge holding portion MEM_L1 and the charge holding portion MEM_L2 is set to a period Tlb by shortening the charge accumulation period Tla shown in FIG. 5A by the minimum controllable period Tmin. In this case, since the charge transfer to the charge holding portion MEM_L1 and the charge holding portion MEM_L2 is performed five times, the total charge accumulation period in one frame period is a period Ttb, which is five times of the minimum controllable period Tmin shorter than the total charge accumulation period Tta. However, the total charge accumulation period Ttb in one frame period is shorter than the desired charge accumulation period Texp, and an error Tdiffb exceeding the minimum controllable period Tmin occurs.

Figure 5C:
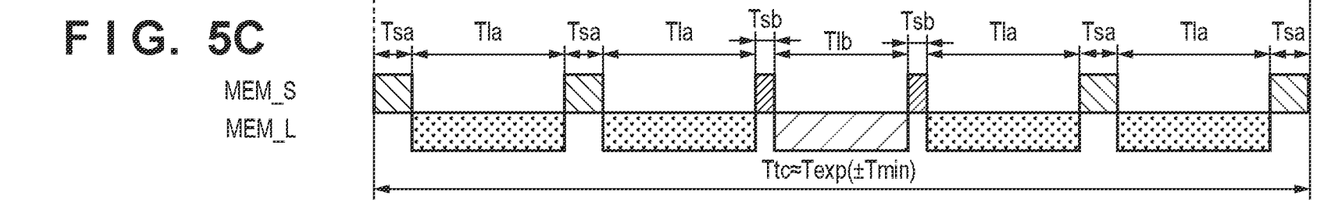

FIG. 5C is a diagram illustrating an example of charge accumulation period control in this embodiment. By making at least one charge accumulation period for at least one charge holding portion among a plurality of charge holding portions different from the other charge accumulation periods, the total charge accumulation period is adjusted to approach the desired charge accumulation period Texp. In FIG. 5C, the charge accumulation period is controlled so as to be divided into a plurality of charge accumulation periods of two different lengths for the charge holding portion MEM_S1 and the charge holding portion MEM_S2, that is, a charge accumulation period Tsa and a charge accumulation period Tsb. Furthermore, the charge accumulation period is controlled so as to be divided into a plurality of charge accumulation periods of two different lengths for the charge holding portion MEM_L1 and the charge holding portion MEM_L2, that is, a charge accumulation period Tla and a charge accumulation period Tlb.

In the example of FIG. 5C, the charge accumulation period Tsb is shorter than the charge accumulation period Tsa. Among the charge accumulation periods Tsi for the charge holding portion MEM_S1 and the charge holding portion MEM_S2, charge accumulation control is performed such that the lengths of charge accumulation periods Ts1, Ts2, Ts5, and Ts6 are of the charge accumulation period Tsa, and the lengths of charge accumulation periods Ts3, and Ts4 are of the charge accumulation period Tsb.

Furthermore, among the charge accumulation periods Tlj for the charge holding portion MEM_L1 and the charge holding portion MEM_L2, charge accumulation control is performed such that the lengths of charge accumulation periods Tl1, Tl2, Tl4, and Tl5 are of the charge accumulation period Tla, and the lengths of charge accumulation periods Tl3 are of the charge accumulation period Tlb.

By controlling each charge accumulation period in this way, the total charge accumulation period in one frame period becomes Ttc, and it is possible to make the total charge accumulation period approach the desired charge accumulation period Texp until the difference becomes smaller than the minimum controllable period Tmin. Accordingly, since the charge accumulation period for one charge holding portion can be freely set, the total charge accumulation period can be brought close to the desired charge accumulation time Texp, regardless of the number of time-division transfers.

Note that although FIG. 5C shows an example in which the plurality of charge accumulation periods of two different lengths are adapted for one charge storage portion, however, a plurality of charge accumulation periods of two or more different lengths may be set for at least one charge storage portion among a plurality of charge storage portions. Further, the number of the time-division transfers may be changed depending on the total charge accumulation period or the like.

Figure 5D:
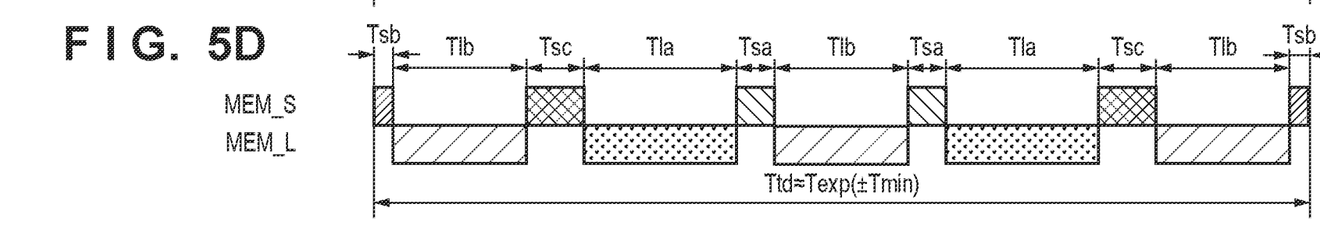

FIG. 5D shows another example of charge accumulation control in this embodiment, in which a plurality of charge accumulation periods of three different lengths, namely, a charge accumulation period Tsa, charge accumulation period Tsb, and charge accumulation period Tsc, are used for the charge holding portion MEM_S1 and the charge holding portion MEM_S2, and a plurality of charge accumulation periods of two different lengths, namely, a charge accumulation period Tla and charge accumulation period Tlb, are used for the charge holding portion MEM_L1 and the charge holding portion MEM_L2. Note that in the example of FIG. 5D, the charge accumulation period Tsb is shorter than the charge accumulation period Tsa, and the charge accumulation period Tsc is longer than either of them.

Of the charge accumulation periods $Ts_i$ for the charge holding portion MEM_S1 and the charge holding portion MEM_S2, charge accumulation control is performed such that the charge accumulation periods $Ts_1$ and $Ts_6$ are controlled to be the charge accumulation period Tsb, the charge accumulation periods $Ts_2$ and $Ts_5$ are to be the charge accumulation period Tsc, and the charge accumulation periods $Ts_3$ and $Ts_4$ are controlled to be the charge accumulation period Tsa. Further, of the charge accumulation periods Tlj for the charge holding portion MEM_L1 and the charge holding portion MEM_L2, charge accumulation control is performed such that the lengths of charge accumulation periods Tl1, Tl3, and Tl5 are of the charge accumulation period Tlb, and the lengths of charge accumulation periods Tl2 and Tl4 are of the charge accumulation period Tla. By controlling the charge accumulation period in this way, the total charge accumulation period Ttd in one frame period can be brought close to the desired charge accumulation period Texp until the difference becomes smaller than the minimum controllable period Tmin, similarly to the case shown in FIG. 5C.

As shown in FIGS. 5C and 5D, by distributing charge accumulation periods symmetrically with respect to the midpoint between the accumulation start time and the accumulation end time, it is possible to coincide the temporal center of gravity of the charge accumulation period Tshort with that of the charge accumulation period Tlong. By controlling the charge accumulation period in this way, it is possible to suppress jitter between frame images in moving image shooting and obtain a high-quality, high-dynamic-range moving image even in a case of shooting a subject moving at high speed or a blinking light source.

Further, there are no restrictions on the lengths or order of charge accumulation periods for one charge holding portion, and the charge accumulation period may be gradually shortened toward the midpoint between the accumulation start time ane the accumulation end time as shown in FIG. 5C. Furthermore, as shown in FIG. 5D, the charge accumulation periods of different lengths may be arranged in the alternating order toward the midpoint between the accumulation start time and the accumulation end time, regardless of the length of each charge accumulation period. Further, the number of charge accumulation periods used may be changed for each of the plurality of charge holding portions.

As described above, according to the first embodiment, the total charge accumulation period can be brought closer to an arbitrarily set charge accumulation period.

Second Embodiment

Next, a second embodiment of the present invention will be described.

Figure 6:
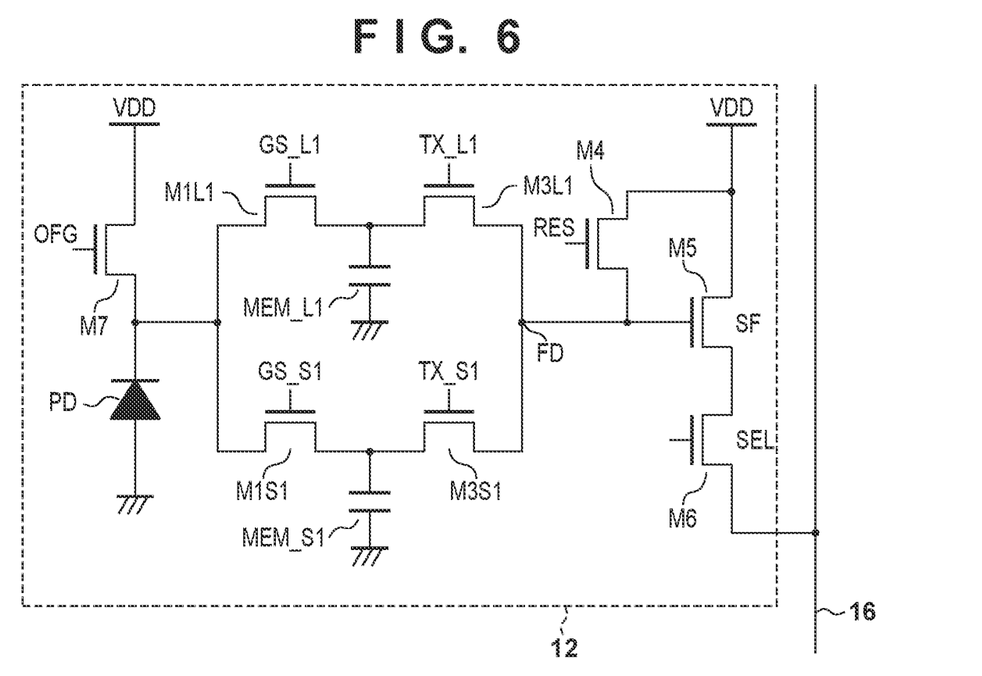
FIG. 6 is an equivalent circuit diagram illustrating a configuration example of a pixel according to the second embodiment.

In the first embodiment, a configuration in which four charge holding portions are provided for one photoelectric conversion unit has been described. In contrast, in the second embodiment, as shown in FIG. 6, a configuration is shown in which two charge holding portions are provided for one photoelectric conversion unit. Note that in the configuration of FIG. 6, the same components as those shown in FIG. 2 are given the same reference numerals, and description thereof will be omitted.

FIG. 6 shows a configuration in which the transfer transistor M1L2, the transfer transistor M3L2, the transfer transistor M1S2, and the transfer transistor M3S2 are omitted from the configuration shown in FIG. 2. In the configuration of the second embodiment as well, similarly to the configuration of the first embodiment, a floating diffusion portion FD or an output unit may be individually connected to each of the two transfer units.

In the configuration shown in FIG. 6, in a case of actuating the photoelectric conversion apparatus 100 in the GS mode, signals cannot be read out during the period in which charges are accumulated and there is a period during which no charge can be acquired in each frame period, making it impossible to acquire a seamless moving image. However, for example, the odd frames may be controlled to be as the charge accumulation periods for accumulating charges in the charge holding portion MEM_L1 and the charge holding portion MEM_S1, and the even frames may be controlled to be as the readout periods for reading out charges from the charge holding portion MEM_L1 and the charge holding portion MEM_S1. In this way, by alternately repeating the period of charge accumulation and the period of reading out signals based on the charges, it is possible to obtain a high-quality, high-dynamic-range moving image, although it is not seamless.

In this case as well, in FIGS. 5C and 5D, MEM_S in the upper portion may be considered as the charge accumulation periods for the charge holding portion MEM_S1 in FIG. 6, and MEM_L in the lower portion may be considered as the charge accumulation periods for the charge holding portion MEM_L1 in FIG. 6. As a result, even with the configuration shown in FIG. 6, it is possible to make the total charge accumulation period approach the desired charge accumulation period until the difference between the total charge accumulation period and the desired charge accumulation period becomes smaller than the minimum controllable period Tmin by performing charge accumulation control using a plurality of charge accumulation periods of two or more different lengths for one charge holding portion, as in the first embodiment.

Note that the first embodiment describes the configuration in which four charge holding portions are provided for each photoelectric conversion unit, and the second embodiment describes the configuration in which two charge holding portions are provided for each photoelectric conversion unit. However, the present invention is not limited thereto. As long as two or more charge holding portions are provided for each photoelectric conversion unit, the above-described operation can be performed in the same manner.

Third Embodiment

Next, a third embodiment of the present invention will be described.

Figure 7:
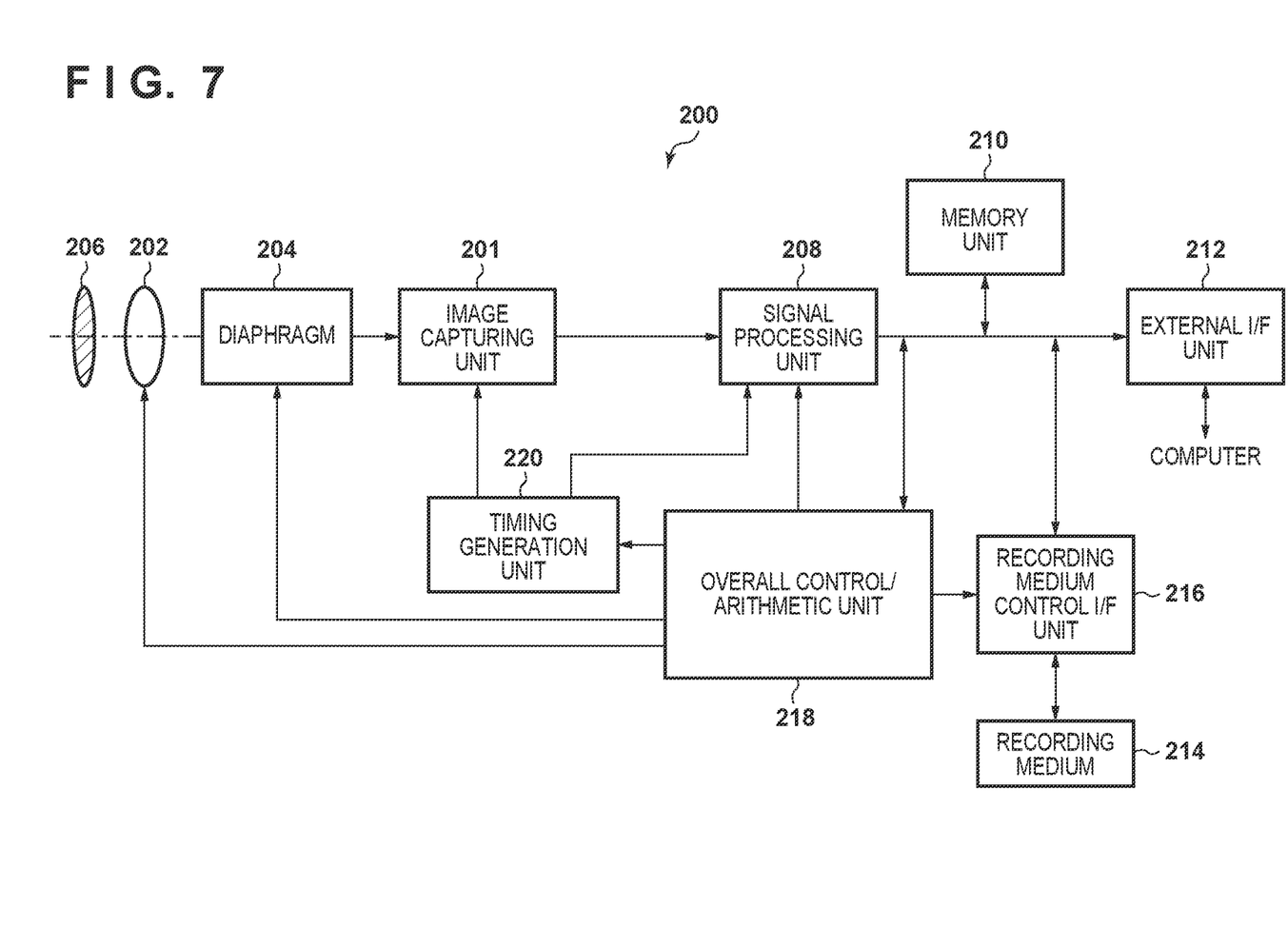
FIG. 7 is a block diagram illustrating a schematic configuration of an image capturing system according to a third embodiment.

FIG. 7 is a block diagram showing a schematic configuration of an image capturing system 200 according to the third embodiment. The image capturing system 200 of this embodiment includes an image capturing unit 201 that uses the photoelectric conversion apparatus 100 described in the first embodiment or the second embodiment. The image capturing system 200 includes, in addition to the image capturing unit 201, a diaphragm 204, a lens unit 202, a barrier 206, an overall control/arithmetic unit 218, a timing generation unit 220, and a signal processing unit 208. Furthermore, the image capturing system 200 includes a memory unit 210, a recording medium control interface (I/F) unit 216, and an external interface (I/F) unit 212.

The lens unit 202 forms an optical image of the subject onto the photoelectric conversion apparatus 100 of the image capturing unit 201. The diaphragm 204 adjusts the amount of light passing through the lens unit 202, and the barrier 206 protects the lens unit 202. The lens unit 202 and the diaphragm 204 configure an optical system that converges light on the image capturing unit 201.

The image capturing unit 201 converts the optical image formed by the lens unit 202 into pixel signal using the photoelectric conversion apparatus 100 as described above, and outputs the pixel signal to the signal processing unit 208. Note that the image capturing unit 201 may include an AD converter that generates a digital signal, and in that case, the image capturing unit 201 outputs the digital signal. The AD converter may be formed in the semiconductor layer (semiconductor substrate) on which the photoelectric conversion apparatus 100 is formed, or may be formed on a semiconductor substrate different from the semiconductor layer on which the photoelectric conversion apparatus 100 is formed.

The signal processing unit 208 processes the pixel signal output from the image capturing unit 201 and generates image data. At this time, the signal processing unit 208 performs various corrections and compressions as necessary, and outputs the image data. Note that the signal processing unit 208 may be formed on the semiconductor substrate on which the image capturing unit 201 is formed.

Furthermore, the signal processing unit 208 of this embodiment uses the two types of pixel signals output from the image capturing unit 201 to generate an image with an expanded dynamic range. This synthesis process is performed based on the ratio between the charge accumulation periods Tlong and Tshort described above. For example, if the pixel signal obtained with the charge accumulation period Tlong is an unsaturated, low-luminance signal, the signal obtained with the charge accumulation period Tlong is used. On the other hand, if the pixel signal obtained with the charge accumulation period Tlong is a saturated high-luminance signal, a signal obtained by multiplying the signal obtained with the charge accumulation period Tshort by a synthesis ratio is used.

Here, as explained in the first and second embodiments, since the difference in time to be adjusted changes depending on the desired charge accumulation period and the total charge accumulation period, the adjustment amount for adjusting the charge accumulation periods so as to match the desired charge accumulation period Texp changes. Therefore, by using the ratio between the adjusted charge accumulation periods (Tlong/Tshort) as the synthesis ratio, it is possible to obtain a high-quality, high-dynamic-range image.

The overall control/arithmetic unit 218 controls the entire image capturing system 200 and performs various calculations. Note that the various calculations include calculations for adjusting the charge accumulation periods corresponding to respective charge transferences described above in order to match the total charge accumulation period of the charge accumulation period Tlong and charge accumulation period Tshort to the desired charge accumulation period Texp.

Therefore, the synthesis ratio may be obtained by the overall control/arithmetic unit 218 or may be obtained by the signal processing unit 208 by outputting the charge accumulation period Tlong and charge accumulation period Tshort to the signal processing unit 208. The timing generation unit 220 outputs various timing signals to the image capturing unit 201 and the signal processing unit 208 under the control of the overall control/arithmetic unit 218.

Note that the timing signals and the like may be input from the outside, and the image capturing system 200 only needs to have at least the image capturing unit 201 and the signal processing unit 208 that processes the output signal output from the image capturing unit 201.

The memory unit 210 is used to temporarily store image data, and the external I/F unit 212 is used to communicate with an external computer or the like. The recording medium control I/F unit 216 controls recording and reading of image data on a recording medium 214 such as a semiconductor memory. Note that the recording medium 214 may be built into the image capturing system 200 or may be detachable.

As described above, according to the third embodiment, a high-quality, high-dynamic-range moving image can be obtained by combining charge signals shot in the GS mode with different charge accumulation periods.

Other Embodiments

Note that the present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-076313, filed May 2, 2023 which is hereby incorporated by reference herein in its entirety.

What is claimed is:

1. A photoelectric conversion apparatus having a plurality of pixels each including a photoelectric conversion element that converts incident light into charges and accumulates the charges, and a plurality of first holding portions, the apparatus comprising:
   a control unit that controls a charge accumulation period in the photoelectric conversion elements in units of predetermined minimum controllable period; and
   a setting unit that sets a charge accumulation period in one frame period,
   wherein the control unit
      controls to transfer charges from the photoelectric conversion elements to the plurality of first holding portions in turn a plurality of times during each frame period, and
      controls the charge accumulation period in the photoelectric conversion elements such that a difference between the set charge accumulation period and a total of divided charge accumulation periods each for accumulating charges to be transferred the plurality of times in each frame period becomes shorter than the minimum controllable period, and
   wherein the control unit and the setting unit are implemented by one or more processors and/or circuitry.

2. The photoelectric conversion apparatus according to claim 1, wherein the control unit controls at least one of the number of times the charges are transferred and the divided charge accumulation period.

3. The photoelectric conversion apparatus according to claim 1, wherein the control unit controls the distribution of the divided charge accumulation periods for accumulating the charges to be transferred to each of the plurality of first holding portions in the each frame period such that the distribution of the divided charge accumulation periods are symmetrical about a midpoint between the start and the end of the charge accumulation period in the photoelectric conversion elements.

4. The photoelectric conversion apparatus according to claim 1, wherein the control unit uses two different lengths of periods for the divided charge accumulation periods for accumulating charges to be transferred to at least one of the plurality of first holding portions.

5. The photoelectric conversion apparatus according to claim 1, wherein each pixel further includes a plurality of second holding portions,
   wherein, in the next frame after transferring charges to the plurality of first holding portions, the control unit performs the same charge transfer control to the plurality of second holding portions as to the plurality of first holding portions.

6. The photoelectric conversion apparatus according to claim 5 further comprising a readout unit that reads out charges accumulated in the plurality of first holding portions and the plurality of second holding portions,
   wherein the readout unit
      reads out charges accumulated in the plurality of second holding portions in a frame in which charges are transferred to the plurality of first holding portions, and
      reads out charges accumulated in the plurality of first holding portions in a frame in which charges are transferred to the plurality of second holding portions.

7. The photoelectric conversion apparatus according to claim 1, wherein the control unit controls sums of the divided charge accumulation periods for accumulating charges to be transferred to the plurality of first holding portions, respectively, to be different from each other.

8. An image capturing apparatus comprising:
a photoelectric conversion apparatus having a plurality of pixels each including a photoelectric conversion element that converts incident light into charges and accumulates the charges, and a plurality of first holding portions, that comprises:
  a control unit that controls a charge accumulation period in the photoelectric conversion elements in units of predetermined minimum controllable period; and
  a setting unit that sets a charge accumulation period in one frame period; and
a lens unit that forms an optical image of a subject on the photoelectric conversion elements,
wherein the control unit
  controls to transfer charges from the photoelectric conversion elements to the plurality of first holding portions in turn a plurality of times during each frame period, and
  controls the charge accumulation period in the photoelectric conversion elements such that a difference between the set charge accumulation period and a total of divided charge accumulation periods each for accumulating charges to be transferred the plurality of times in each frame period becomes shorter than the minimum controllable period, and
wherein the control unit and the setting unit are implemented by one or more processors and/or circuitry.

9. An image capturing apparatus comprising:
a photoelectric conversion apparatus having a plurality of pixels each including a photoelectric conversion element that converts incident light into charges and accumulates the charges, and a plurality of first holding portions, that comprises:
  a control unit that controls a charge accumulation period in the photoelectric conversion elements in units of predetermined minimum controllable period; and
  a setting unit that sets a charge accumulation period in one frame period; and
a processing unit that processes signals corresponding to charges read out from the photoelectric conversion apparatus,
wherein the control unit
  controls to transfer charges from the photoelectric conversion elements to the plurality of first holding portions in turn a plurality of times during each frame period,
  controls the charge accumulation period in the photoelectric conversion elements such that a difference between the set charge accumulation period and a total of divided charge accumulation periods each for accumulating charges to be transferred the plurality of times in each frame period becomes shorter than the minimum controllable period, and
  controls sums of the divided charge accumulation periods for accumulating charges to be transferred to the plurality of first holding portions, respectively, to be different from each other,
wherein the processing unit performs processing to expand a dynamic range for each pixel based on the signals, and
wherein the control unit, the setting unit and the processing unit are implemented by one or more processors and/or circuitry.

10. The image capturing apparatus according to claim 9, wherein the processing unit expands the dynamic range based on a ratio of charge accumulation periods corresponding to the signals.

11. A control method of a photoelectric conversion apparatus having a plurality of pixels each including a photoelectric conversion element that converts incident light into charges and accumulates the charges, and a plurality of first holding portions, the method comprising:
setting a charge accumulation period in one frame period; and
controlling a charge accumulation period in the photoelectric conversion elements in units of predetermined minimum controllable period,
wherein in the controlling of the charge accumulation period,
  controlling to transfer charges from the photoelectric conversion elements to the plurality of first holding portions in turn a plurality of times during each frame period, and
  controlling the charge accumulation period in the photoelectric conversion elements such that a difference between the set charge accumulation period and a total of divided charge accumulation periods each for accumulating charges to be transferred the plurality of times in each frame period becomes shorter than the minimum controllable period.

12. A non-transitory computer-readable storage medium, the storage medium storing a program that is executable by the computer, wherein the program includes program code for causing the computer to perform a control method of a photoelectric conversion apparatus having a plurality of pixels each including a photoelectric conversion element that converts incident light into charges and accumulates the charges, and a plurality of first holding portions, the method comprising:
setting a charge accumulation period in one frame period; and
controlling a charge accumulation period in the photoelectric conversion elements in units of predetermined minimum controllable period,
wherein in the controlling of the charge accumulation period,
  controlling to transfer charges from the photoelectric conversion elements to the plurality of first holding portions in turn a plurality of times during each frame period, and
  controlling the charge accumulation period in the photoelectric conversion elements such that a difference between the set charge accumulation period and a total of divided charge accumulation periods each for accumulating charges to be transferred the plurality of times in each frame period becomes shorter than the minimum controllable period.

* * * * *